July 23, 1929.   R. H. KIPP   1,721,697
DISK CULTIVATOR
Filed Sept. 23, 1927   4 Sheets-Sheet 2
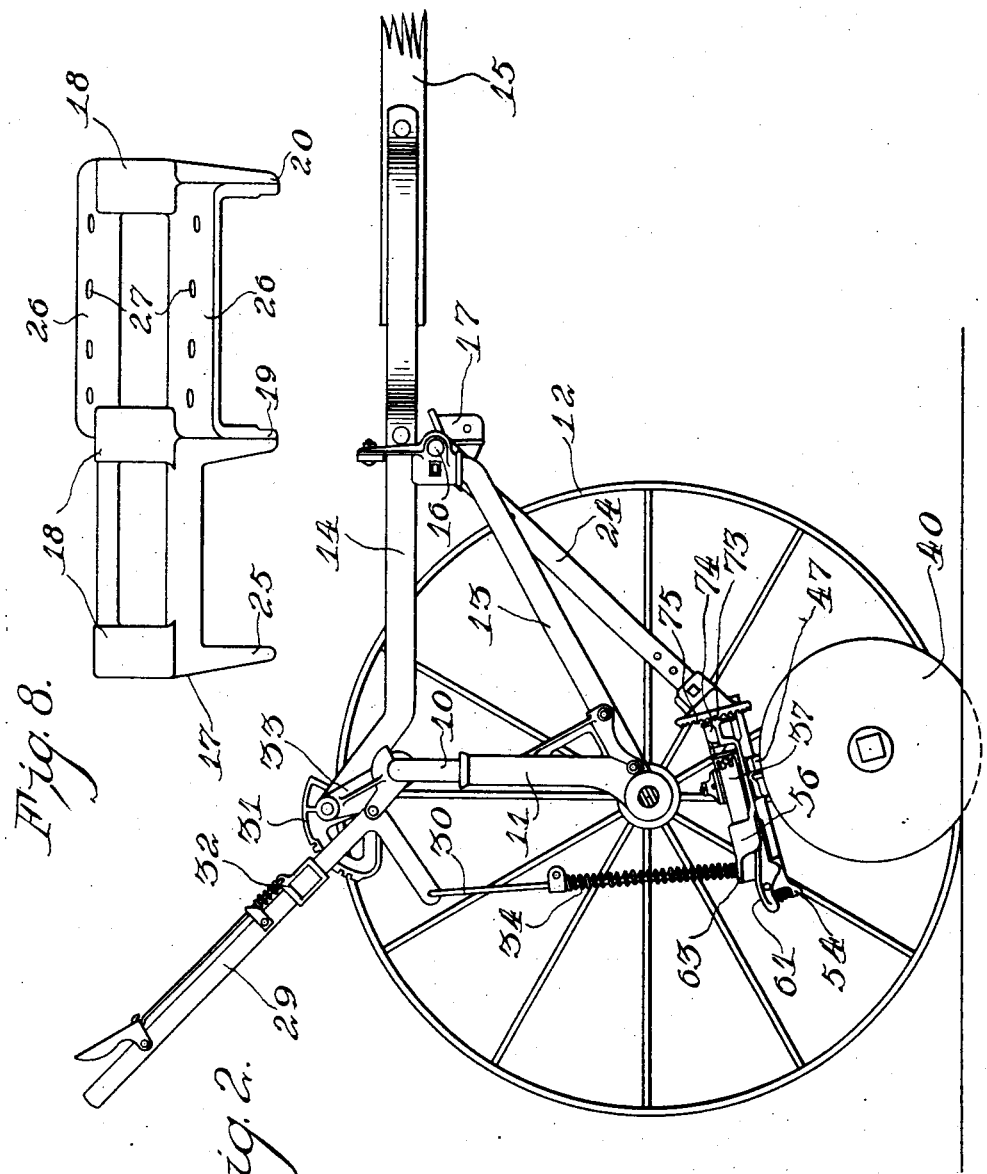
Inventor.
Roy H. Kipp.
By

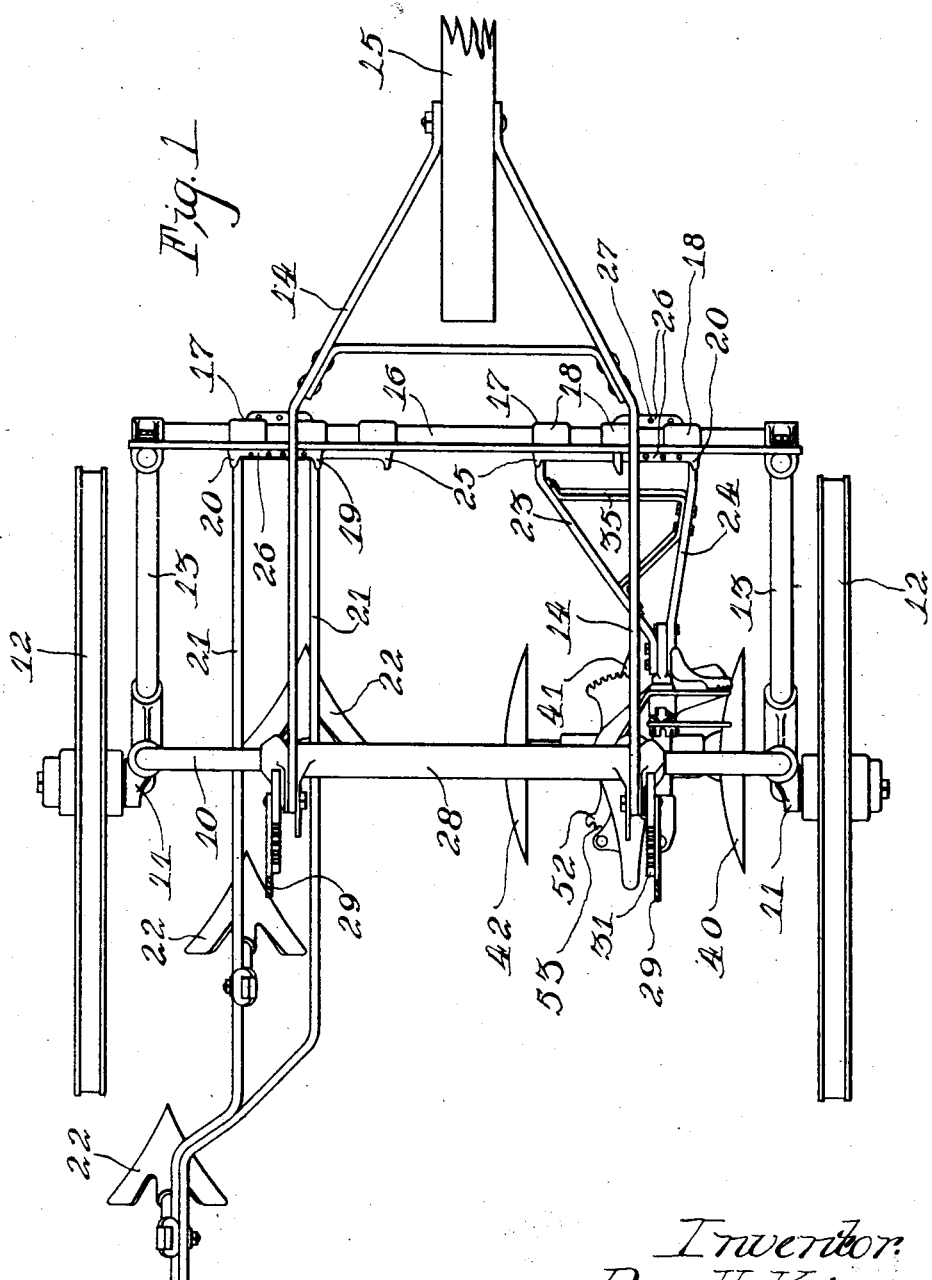

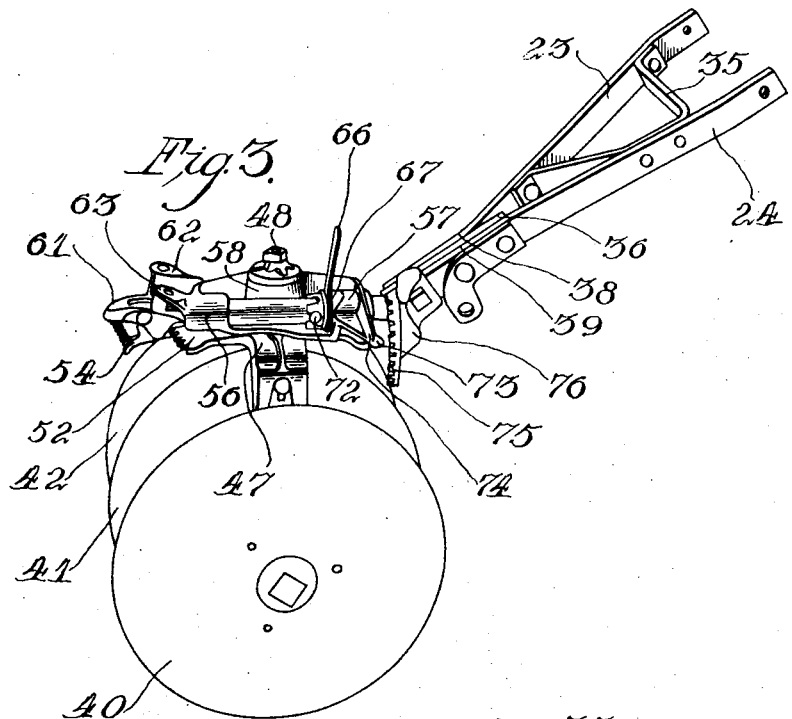
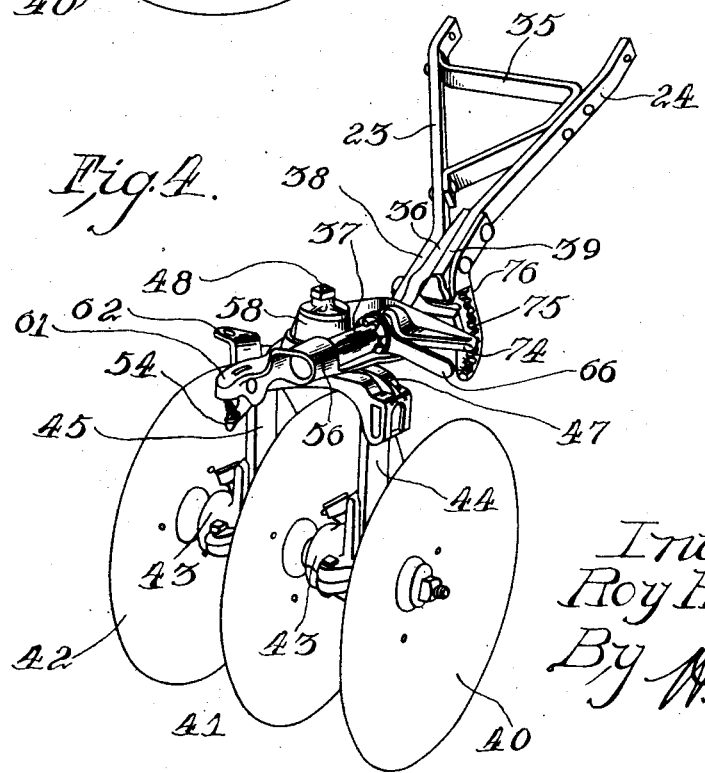

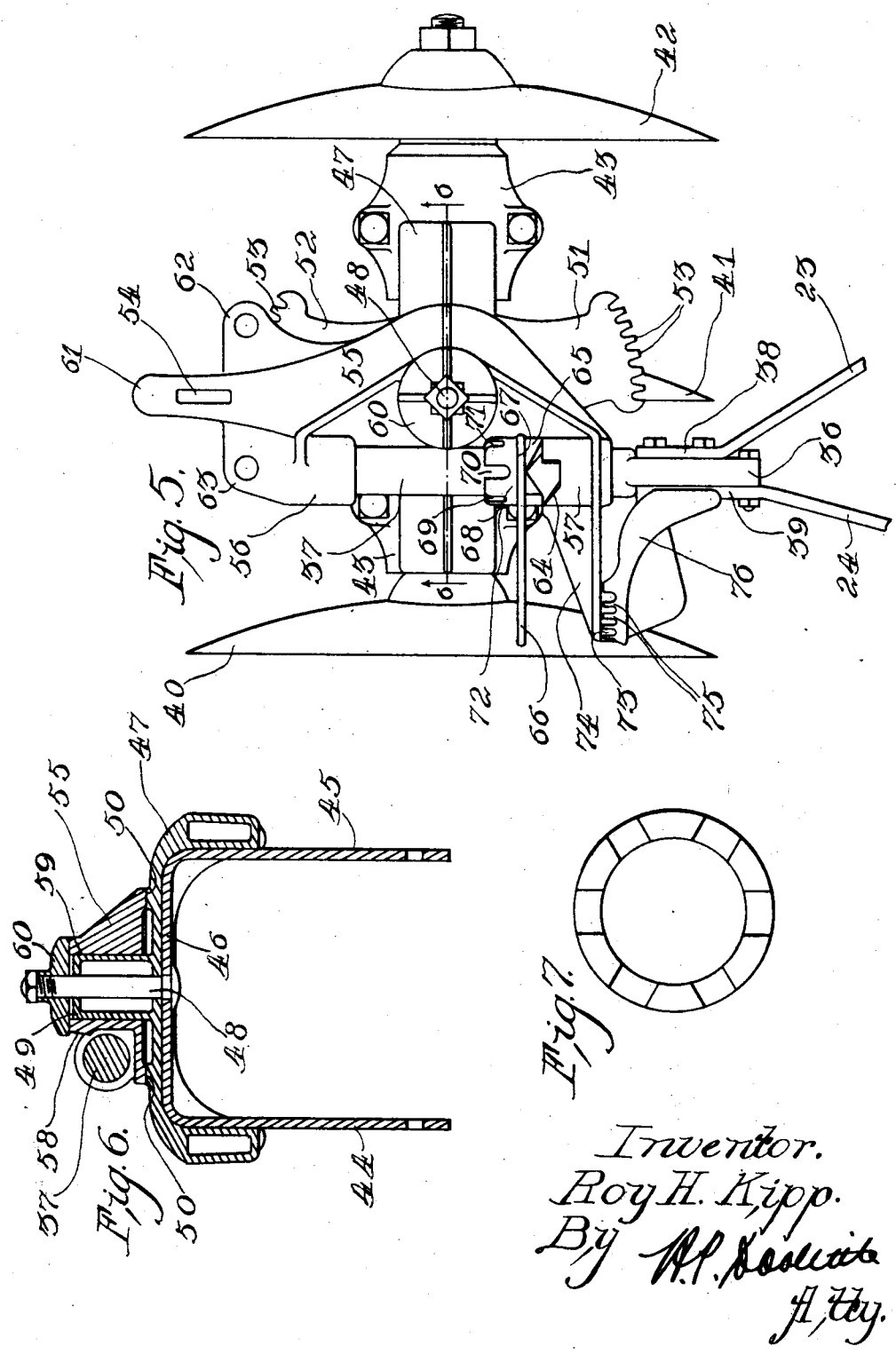

Patented July 23, 1929.

1,721,697

UNITED STATES PATENT OFFICE.

ROY H. KIPP, OF CHICAGO, ILLINOIS, ASSIGNOR TO INTERNATIONAL HARVESTER COMPANY, A CORPORATION OF NEW JERSEY.

DISK CULTIVATOR.

Application filed September 23, 1927. Serial No. 221,428.

This invention presents improvements in cultivators, and more particularly in the structure of a riding cultivator which can, by novel mechanism hereinafter disclosed, be advantageously and quickly changed from a shovel cultivator to a disk cultivator without the removal of parts other than the cultivator beams.

An object of the invention is to provide a novel and advantageous cultivator structure adapted to receive cultivator beams of different characteristics.

A further object of the invention is to provide improvements in a disk cultivator whereby the operation and use of such a cultivator are materially enhanced. More specifically, an object of the invention is to improve a cultivator beam unit of the disk type.

It is also an object of the invention to provide a cultivator beam construction for disk cultivators having a novel structure and novel mode of operation.

Other objects of the invention will appear as the following description proceeds.

Figure 1 is a plan of the illustrative cultivator showing in one part of the view a shovel beam and in another part a disk cultivator beam;

Figure 2 is a view in the nature of a side elevation showing the arrangement of the illustrative disk cultivator unit arranged in a cultivator organization;

Figure 3 is a perspective view of the illustrative disk cultivator beam unit;

Figure 4 is a perspective view of the beam unit shown in Figure 3, but taken from a different angle so as to show other parts of the structure;

Figure 5 is an enlarged plan view of the disk gang and the support therefor forming parts of the illustrative unit;

Figure 6 is a vertical, sectional view taken on the section line 6—6 of Figure 5, and looking in the direction of the arrows;

Figure 7 is an end elevation of the locking cam used to maintain the disk gang in any desired position; and Figure 8 is a plan of the novel coupler used in the illustrative machine.

The illustrative cultivator comprises the arched axle 10, the pivot axles 11, the supporting wheels 12, the steering arms 13, and the frame construction 14. A tongue 15 is secured to the frame construction 14 in a manner well known in the art. The steering arms 13 are connected by a shift rod 16 so as to pivot the wheels 12 about vertical axes formed by the upright parts of the arched axle 10. Upon shift rod 16, couplers 17 are secured. The structure of one of these couplers is clearly shown in Figure 8 of the drawings. It comprises a plurality of sleeve portions 18 in which the rod 16 is received. Laterally extending lugs 19 and 20 are adapted to receive and be secured to the parts 21 of the shovel cultivator beam clearly illustrated in Figure 1 of the drawings where it is there shown carrying the shovels 22.

When two of the shovel beams are provided, the lugs 19 and 20 of each of the brackets 17 are used and it is to be understood that the cultivator will have two beams like the shovel beam shown in the upper part of Figure 1.

When the owner of the cultivator desires to change the machine to a disk cultivator, the shovel beams are removed and disk cultivator beam units having forwardly diverging bars 23 and 24 are connected to the lugs 25 and 20 of each of the couplers 17. The flat connecting portions 26 of the couplers are preferably provided with openings 27 for the securement of shifting rods such as are shown in the patent to Cody #1,358,-057, November 9, 1920.

Enough of the entire cultivator organization is shown in Figures 1 and 2 of the drawings to enable the reader to understand the application of the novel parts. In these figures a sleeve 28 forms the middle portion of the arched axle, and also forms supports for levers 29 connected by spring pressure rods 30 to the cultivator beams. Associated with these devices are the brackets 31, the detent mechanisms 32, the crank arms 33, and the pressure springs 34.

The particular structure of the illustrative disk cultivator beam units is shown in Figures 3, 4 and 5 of the drawings. The bars 23 and 24 of each unit are widely spaced at their forward ends as shown and are forwardly convergent at considerable angles for the purpose of preventing lateral movement of the disk gangs. Such gangs produce considerable lateral thrusts and it is important that these thrusts be prevented from moving the cultivating elements out of their desired paths. The construction shown advantageously accomplishes this result. The bars 23 and 24 are rigidly secured to a brace 35 as shown. At their rearward ends the bars are spaced so as to receive the stem 36 of the shaft or trunnion 37 upon which the disk gang is supported. The stem 36 and the rearward extensions 38 and 39 of the bars 23 and 24 are rigid and substantially secured together. A disk gang clearly shown in the drawings is mounted upon the trunnion 37 for rotative adjustment thereon. This disk gang comprises disks 40, 41 and 42 connected by an axle which is journaled in bearings 43 supported by the legs 44 and 45 of a yoke. This yoke is preferably of bar iron formation and has its bight 46 seated in a socket in a support 47. As clearly indicated in Figure 6 of the drawings, this support is in the form of a unitary casting to which a bight 46 is rigidly secured by the bolt 48. The central portion of the support 47 is preferably formed with an upstanding cylindrical extension 49 forming a part of a journal construction which will permit the adjustment of the disk gang about an upright axis to vary the angle of the disks. The upper surface of the support 47 is also formed with bearing surfaces 50 preferably widely spaced from the upright axis about which the disk gang may be adjusted. The support 47 is also preferably formed with opposite extensions 51 and 52 provided with teeth 53 between which a detent 54 may be engaged to hold the disk gang in any position to which it is angled. Only one of the extensions 51 and 52 is used at any one time, the detent 54 being located at the rear of the cultivator construction, as shown in the drawings. When the detent is released from engagement with the teeth, it is shown engaging, in Figure 5 of the drawings, the support, and the entire disk gang may be rotated about the upright axis passing through the bolt 48 so that the disk gang may be changed from an inthrow gang to an out-throw gang.

The detent 54 is preferably pivoted upon a bracket 55, herein shown as a casting having two widely separated journal portions 56 and 57, rotatably receiving the trunnion 37. This construction affords a large mounting of the disk gang for the purpose of adequately resisting the working strains to which the gang is subjected in operation. It also affords such a support that wear is minimized, thereby practically eliminating the looseness of construction which has characterized prior disk cultivators. Intermediate the journal portions 56 and 57 the bracket 55 is provided with an upstanding cylindrical portion 58 having a cylindrical bore 59 forming a bearing surface for the extension 49 of the support 47. The bolt 48 and the cap 60 secure the parts together as clearly indicated in Figure 6 of the drawings.

The rearward portion of bracket 55 is provided with an extension 61 in which the detent 54 is mounted. On either side of this extension securing portions 62 and 63 are provided. As indicated in Figure 2 of the drawings, the rod 30 passes through one of the portions 62, 63.

The journal portion 57 of bracket 55 is formed with clutch teeth having sloping cam faces 64, as indicated in Figure 5 of the drawings. Cooperating with the cam faces 64 are similarly formed cam teeth 65 on a cam lever 66 journaled upon the trunnion 37. This cam lever has a shoulder 67 in contact with an abutment herein shown as a sleeve 68 adapted to be fixed at any one of a number of positions upon the trunnion 37. The sleeve 68 is preferably formed with a series of notches 69, 70 and 71, through any one of which a pin 72 may be passed to secure the sleeve upon the trunnion. The pin 72 passes through a transverse bore in the trunnion 37.

When the cam lever 66 is rotated so as to allow the tooth having the cam face 65 to slide down the cam face 64, the bracket 55 may be moved rearwardly so as to release the teeth 73 of the extension 74 from engagement with the teeth 75 of the detent bracket 76, which is preferably fixedly secured to the cultivator beam, as indicated in Figures 3, 4 and 5 of the drawings.

When these teeth are thus withdrawn from engagement, the bracket 55 and the disk gang may be rotated about the trunnion 37 so as to change the inclination of the gangs as desired. Thereafter, the cam lever 66 is rotated so as to move the cam face 65 up the cam face 64 and consequently force the bracket 55 and the disk gang forwardly, thereby causing an interlocking of the teeth 73 and 75.

Although the invention has been described with reference to one particular structure, it is to be understood that the invention is not limited thereto, but that it is of a scope commensurate with the breadth of the appended claims.

What is claimed as new is:

1. A cultivator beam comprising a dragbar terminating in a shaft portion, a supporting bracket having spaced bearings journaled on the shaft portion, means for adjusting the bracket on the axis of the shaft, a socket on the bracket having an axis at right angles to said bearings and located between them and at one side of the shaft portion, and a depending implement carrying member having a stem journaled in said socket for rotary adjustment.

2. A cultivator beam comprising a dragbar terminating in a cylindrical shaft forming a longitudinal extension of the beam, a supporting bracket having spaced horizontal bearings journaled on the end portions of said shaft, means for locking the bracket on the shaft, a vertical socket on the bracket located between said bearings and at one side of the axial line thereof, a depending yoke rotatably mounted in said socket, earth working means carried by the yoke, and means for locking the yoke in the socket.

3. A cultivator beam comprising a dragbar terminating in a cylindrical shaft forming a longitudinal extension of the beam, a supporting bracket having a portion journaled on said shaft for rotary movement and axial movement thereon, complemental interlocking elements on the bracket and shaft adapted to be locked and released by movement of the bracket axially of the shaft at various angular positions of the bracket on the shaft, a collar fixed on the shaft, a cam lever journaled on the shaft with one face abutting said collar and the opposite face engaging the bracket, and a cooperating cam face on the bracket, whereby rocking the lever causes connection or disconnection of the interlocking elements.

4. A cultivator beam construction comprising diverging bars having spaced parallel free ends, a coupling sleeve connecting said ends, a shaft secured to the other ends of said bars and forming a cylindrical prolongation thereof, an implement carrying bracket journaled on said shaft, and means for locking said bracket on the shaft at different angular positions about the axis of the shaft.

In testimony whereof I affix my signature.

ROY H. KIPP.